(12) United States Patent
Spencer

(10) Patent No.: US 10,248,357 B2
(45) Date of Patent: Apr. 2, 2019

(54) DATA STORAGE SYSTEM WITH HARDWARE-BASED MESSAGE ROUTING

(71) Applicant: Seagate Technology LLC, Cupertino, CA (US)

(72) Inventor: Thomas V. Spencer, Fort Collins, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/642,404

(22) Filed: Jul. 6, 2017

(65) Prior Publication Data

US 2019/0012113 A1 Jan. 10, 2019

(51) Int. Cl.
*G06F 3/06* (2006.01)
*G06F 13/10* (2006.01)

(52) U.S. Cl.
CPC .......... *G06F 3/0656* (2013.01); *G06F 3/061* (2013.01); *G06F 3/067* (2013.01); *G06F 13/102* (2013.01)

(58) Field of Classification Search
USPC .............................................. 710/52–57, 310
See application file for complete search history.

(56) References Cited

U.S. PATENT DOCUMENTS

| | | | |
|---|---|---|---|
| 5,331,637 A | 7/1994 | Francis et al. | |
| 5,390,298 A | 2/1995 | Kuszmaul et al. | |
| 6,052,680 A | 4/2000 | Towell | |
| 6,119,215 A | 9/2000 | Key et al. | |
| 6,202,079 B1 | 3/2001 | Banks | |
| 6,611,879 B1 * | 8/2003 | Dobecki | G06F 3/0619 710/1 |
| 6,615,282 B1 * | 9/2003 | Futral | G06F 13/385 710/1 |
| 7,395,332 B2 | 7/2008 | Gai et al. | |
| 7,720,973 B2 * | 5/2010 | Patiejunas | G06F 9/546 709/203 |
| 8,892,767 B1 * | 11/2014 | Yi | G06F 13/102 709/237 |
| 9,077,619 B2 * | 7/2015 | Edsall | H04L 43/08 |
| 2006/0123166 A1 * | 6/2006 | Toebes | H04L 67/14 710/106 |

* cited by examiner

*Primary Examiner* — Raymond N Phan
(74) *Attorney, Agent, or Firm* — Hall Estill Attorneys at Law

(57) ABSTRACT

A data storage system may have a first data storage device and a second data storage device connected with a host via a network. The network can consist of a network controller having a message module that generates a buffer progression plan and then assigns a first system message to a first buffer and first computing unit of the first data storage device and assigns a second system message to a second buffer and second computing unit of the second data storage device. The respective first and second computing units may then service the first and second system messages.

20 Claims, 3 Drawing Sheets

DATA STORAGE SYSTEM WITH HARDWARE-BASED MESSAGE ROUTING

SUMMARY

A data storage system, in accordance with some embodiments, has a first data storage device and a second data storage device connected with a host via a network. The network consists of a network controller having a message module that generates a buffer progression plan and then assigns a first system message to a first buffer and first computing unit of the first data storage device and assigns a second system message to a second buffer and second computing unit of the second data storage device. The respective first and second computing units then service the first and second system messages.

DETAILED DESCRIPTION

The introduction of solid-state data storage provided greater data access speeds than rotating hard disk drives. However, non-volatile solid-state data storage, such as flash memory, can be plagued by relatively high data processing and organization expenses upstream of the non-volatile memory. Such data processing and organization can increase the number, volume, and time associated with servicing data read requests, data write requests, and data maintenance operations. The overall increase in system operations can emphasize the speed and reliability of system messages that convey data and/or system information to and from the various computing aspects of a data storage system.

With greater amounts and volumes of messages being transmitted and processed along with user-generated data, reliance on software-based message routing can add complexity and time that can degrade data storage system performance. Hence, various embodiments are directed to hardware-based message handling that efficiently and reliably distributes messages. Such hardware-based message handling can operate with selective software backup that supplements, or corrects, hardware-based message routing. The combination of hardware-based routing along with firmware backup provides fast and consistent message servicing.

Figure 1:
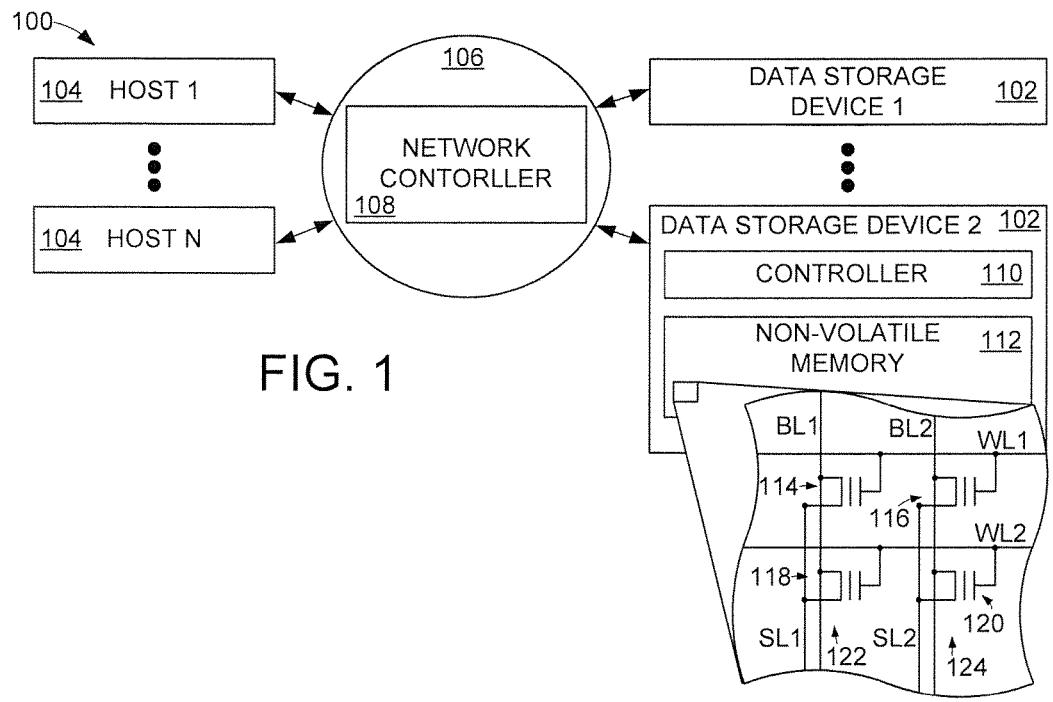
FIG. 1 displays portions of an example data storage system in which various embodiments may be practiced.

A block representation of an example data storage system 100 is displayed in FIG. 1 in accordance with some embodiments. The data storage system 100 can consist of any number of data storage devices 102 connected to any number of hosts 104 via a wired and/or wireless network 106. It is contemplated that a variety of data storage devices 102 can be utilized with different types of memory and varying performance characteristics, such as capacity, data access latency, and physical size. The various hosts 104 can also be different types of computing devices with different computing capabilities. For example, a first host can be a server while a second host is a network node and a third host is a virtual machine that are each located at different physical addresses, such as dissimilar states, and operate with different purpose and structure.

The network 106 may consist of one or more circuits, switches, routers, and distribution means that has network hardware that carries out the transfer data signals to, and from, the respective data storage devices 102. The network hardware is not limited to a particular computing aspect, but can in some embodiments consist of at least a network controller 108 that processes and/or distributes data and system messages to assorted aspects of the system 100.

Although not required or limiting, the data storage system 100 can be arranged so that the data storage devices 102 are physically separate. For instance, the data storage devices 102 can be separate entities in a common data storage enclosure housed in a data rack. Alternatively, the data storage devices 102 can be located in different cities or countries. The ability to operate a single data storage system 100 with multiple data storage devices 102 regardless of the physical location of the devices 102 relative to the hosts 104 illustrates the broad applicability of hardware-based handling of system messages.

As shown, at least one data storage device 104 of the system 100 can comprise a controller 110, such as a microprocessor and/or programmable controller, that can direct data into, and out of, at least one non-volatile memory 112, which can be any type of non-volatile data storage, such as NAND flash, filament-based random access memory (RRAM), phase change memory, or rotating magnetic storage. In the event the non-volatile memory 112 is NAND flash, as partially shown schematically in FIG. 1, first (BL1) and second (BL2) bit lines operate with first (WL1) and second (WL2) word lines and first (SL1) and second (SL2) source lines to write and read data stored in first 114, second 116, third 118, and fourth 120 flash cells. It is noted that the respective bit lines correspond with first 122 and second 124 pages of memory that are each the minimum resolution of the memory 112.

It is noted that the construction of the flash memory prevents the flash cells from being individually rewritable in-place and instead are rewritable on a page-by-page basis. Such low data resolution, along with the fact that flash memory wears out after a number of write/rewrite cycles, corresponds with numerous performance bottlenecks and operational inefficiencies compared to memory with cells that are bit addressable. For instance, processing of incoming data to fit a page of flash memory can be expensive in terms of processing power, time, and occupation of valuable buffer/cache space upstream.

Figure 2:
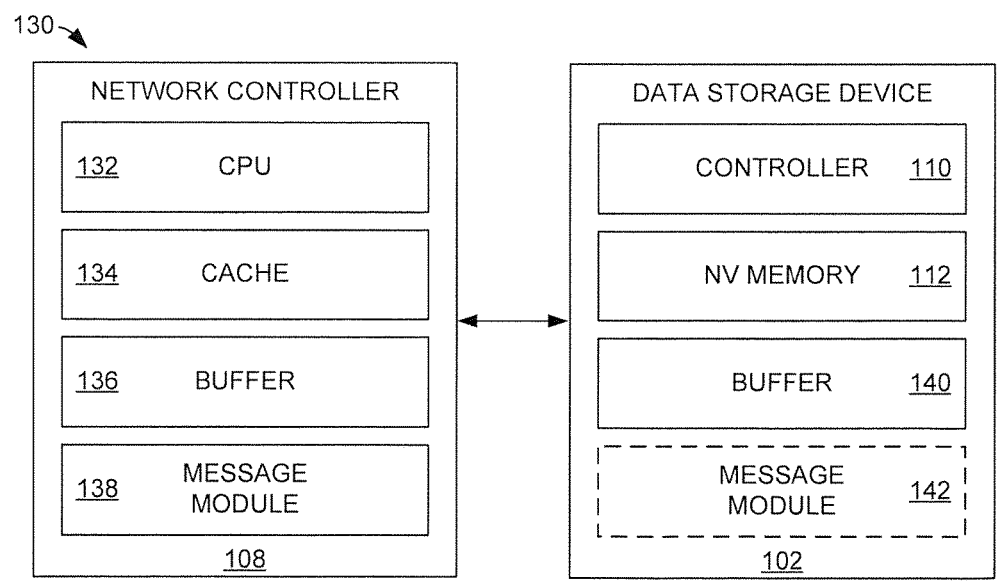
FIG. 2 is a block representation of portions of an example data storage system arranged in accordance with some embodiments.

In FIG. 2, portions of an example data storage system 130 are conveyed as block representations. A network controller 108 can communicate with one or more data storage devices 102 to transfer at least data and system messages. The network controller 108 can comprises a local computer processing unit (CPU) 132 that conducts operations among a local cache memory 134, buffer memory 136, and message module 138. It is contemplated that the network controller 108 has multiple CPUs 132 that conducts operations in the data storage device 102. In other words, the network controller 108 can be configured to provide local and remote computing capabilities for the data storage system 130.

A data storage device 102 can have one or more local buffers 140 that temporarily houses data, and perhaps messages. A message circuit 142, or other message handling circuitry, may be incorporated into the data storage device 102 to distribute, process, and/or correct system messages. While the message circuit 142 can complement the message module 138, the optional nature of the message circuit 142 is shown with segmented lines and the message module 138 is contemplated to be capable of services and handling all system messages without local device message circuits 142.

Figure 3:
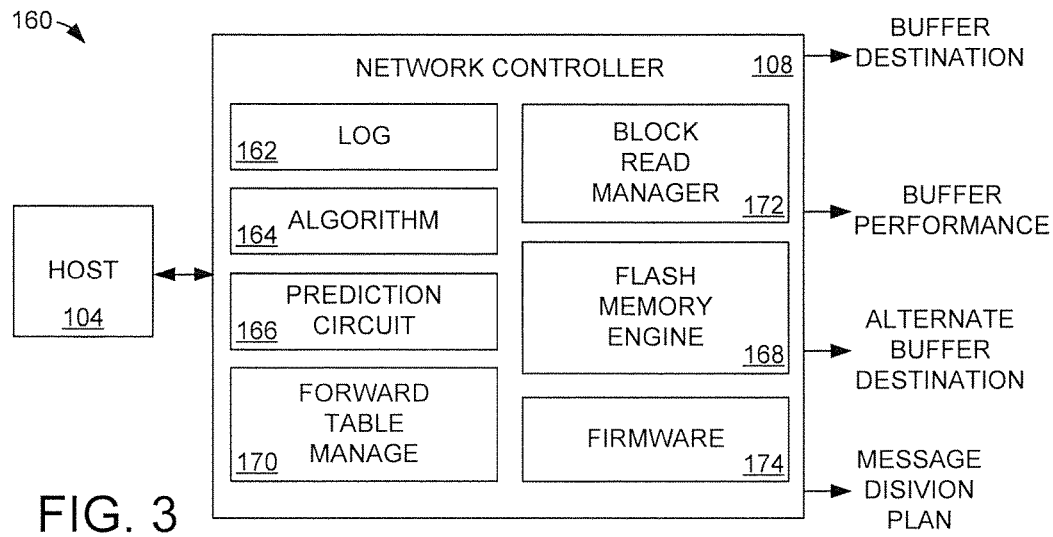
FIG. 3 shows a block representation of portions of an example data storage system configured and operated in accordance with assorted embodiments.

FIG. 3 is a block representation of portions of an example data storage system 160 arranged in accordance with some embodiments. The illustrated network controller 108 can maintain a local, or remote, log 162 of past system activity and/or conditions. One or more algorithms 164 can be locally stored and utilized by a message module CPU to translate and/or compute information about data and messages being transferred, such as service latency, error rate, or risk of failure.

Algorithms 164 may be utilized by a local prediction circuit 166 that can assess current system conditions, as well as logged system activity, to forecast future system events. The ability to detect and proactively take actions to mitigate, or eliminate, predicted system conditions can sustain data storage, and retrieval, performance despite changing system conditions.

With the network controller 108 directing data to and from NAND flash memory resident in one or more data storage devices 102, a flash memory engine 170 can control data formatting, compilation, compression, encryption, storage, and retrieval. The flash memory engine 170, perhaps in conjunction with the network CPU 132, can direct operations of at least a forward table manager 172 and block read manager 174. The forward table manager 172 can control and log updates to data stored in the data storage system 160. The block read manager 174 can control read operations to data stored in the data storage system 160. Firmware 176 can be stored locally, or remotely, and provide policy that can be executed at selected times, such as to repair errors or resolve conflicts.

Through the use of some, or all, of the displayed aspects of FIG. 3, the network controller 108 can produce a buffer destination and at least one alternate buffer destination to provide a buffer performance as well as a message division plan. Although not required, a message division plan can dictate how a message can be split into sub-sections among several different buffers to accomplish the same result as the original message. By utilizing the various aspects of the network controller 108, the data storage system 160 can generate a buffer scheme that coordinates where and when system messages are to be stored.

When messages are statically sent to one or more buffers, which can be dictated by software-based firmware, delays, errors, and conflicts jeopardize the messages and the information conveyed by the messages. Hence, the primary use of software control for system messages place a data storage system 160 at risk of catastrophic failure upon loss, or delay, of messages in response to unexpected events, such as power loss or disconnection of a data storage device 102. To mitigate the risk of such failure, assorted embodiments of the present disclosure provide hardware-based message routing via a message module to rotate the distribution of system messages among different buffers that are controlled by different CPUs. As a result, message losses are minimized to levels that can be repaired by firmware without degrading overall system performance.

Figure 4:
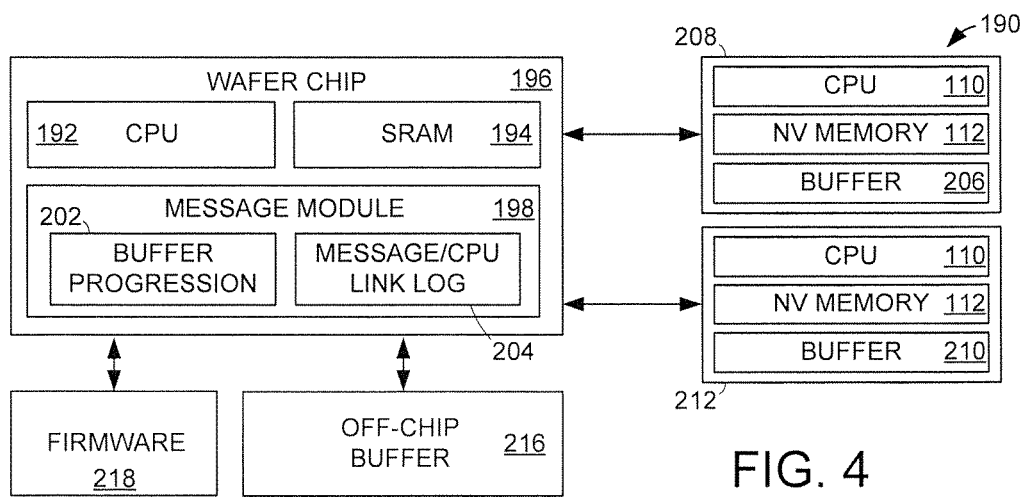
FIG. 4 illustrates portions of an example data storage system arranged in accordance with some embodiments.

FIG. 4 displays a block representation of portions of an example data storage system 190 arranged and operated in accordance with some embodiments to optimize the distribution and handling of system messages. A local network, or data storage device, CPU 192 can be connected to an SRAM buffer 194 on a common wafer chip 196. Construction of the SRAM buffer 194 on the wafer chip 196 provides faster data throughput and reduced power consumption compared to external data storage locations.

The faster data protocol, bus architecture, and physical interconnects of the wafer chip 196 can be enjoyed by a message module 198 to provide efficient system message routing. The message module 198 can have circuitry configured to provide a buffer progression 202 at selected intervals, such as for a predetermined number of messages, size of message, or time of message transmission. The buffer progression 202 can correlate a system message to a particular buffer that corresponds with a CPU. Such correlation is logged with hardware circuitry 204 as a linked message/CPU pair. It is contemplated, but not required, that the assigned CPU handles the servicing of the system message once the message is received in the buffer associated with the CPU.

In the non-limiting example shown in FIG. 4, the message module 198 generates a plurality of different system messages at predetermined times and/or in response to encountered system conditions and then assigns different buffers to the respective system messages with the buffer progression circuitry 202. The assignment of a buffer 206, and corresponding CPU 110 of a first data storage device 208, to a system message triggers transfer of the system message to the data storage device 208. Concurrently or consecutively with the transfer to the first data storage device 208, the message module 198 can send a different second system message to the buffer 210 of a second data storage device 212. The satisfaction of the respective system messages can then be tracked by the link log circuitry 204 of the message module 198.

The message module 198, in some embodiments, can direct system messages to one or more off-chip buffers 216, such as DRAM or non-volatile solid-state memory, linked with the network CPU 192 as the controlling computing means. The hardware-based circuitry 202/204 of the message module 198 can efficiently adapt to changing system conditions and encountered events by monitoring the message/CPU link and resending a failed, or delayed, to the next buffer/CPU in the predetermined progression. Errors and failures to system messages may also be handled by system firmware 218. The ability to utilize hardware-based message routing primarily with firmware 218 backup provides heightened reliability compared to solely hardware, or software, based message routing.

Figure 5:
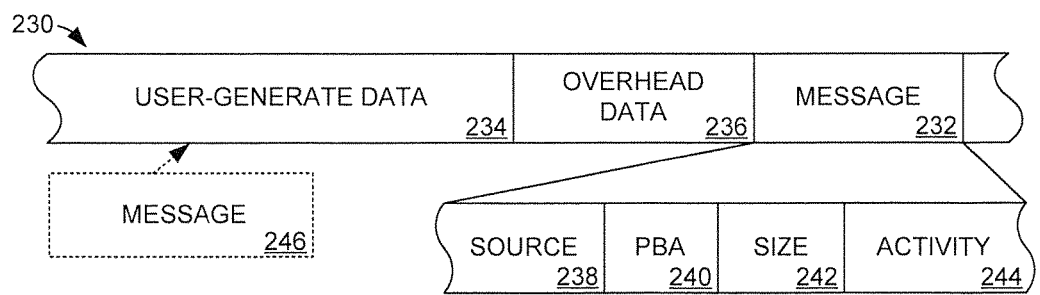
FIG. 5 represents an example data sector that can be used in the example data storage system of FIGS. 1-4.

While a system message can be any signal, information, or query from among components in a data storage device, some embodiments tag a message directly to data. FIG. 5 illustrates a non-limiting example of a data sector 230 that is tagged with a system message 232. The data sector 230 can comprise user-generated data 234 provided by a host 104 and compiled overhead data 236, such as offset and error correction information, that pertains to the user-generated data 234.

The message 232 can also pertain to the user-generated data 234 and consist of biographical information, such as the data source 238, the physical block address (PBA) 240 destination assigned to the data, and the size 242 of the data. The message 232 is not limited to simple biographical information about the user-generated data 234 and can contain one or more activity fields 244 that direct the assigned CPU to conduct actions to, or around, the data sector 230. For instance, the activity field 244 may instruct the CPU to write the data sector redundantly in multiple pages, keep the data sector in the buffer for an extended period of time, or conduct garbage collection operations to portions of the non-volatile memory.

As shown in FIG. 5, the message 232 can be consecutively positioned, logically, relative to the user-generated data 234 and overhead data 236, but such arrangement is not required. Segmented message 246 depicts how a system message can be tagged to the user-generated data 234 without being sequentially logically, or physically, assigned. The flexibility to tag a data sector 230 with data specific info in addition to activity to be carried out by a CPU is more efficient than issuing separate system messages, particularly when message distribution is carried out on-chip, as shown in FIG. 4.

Figure 6:
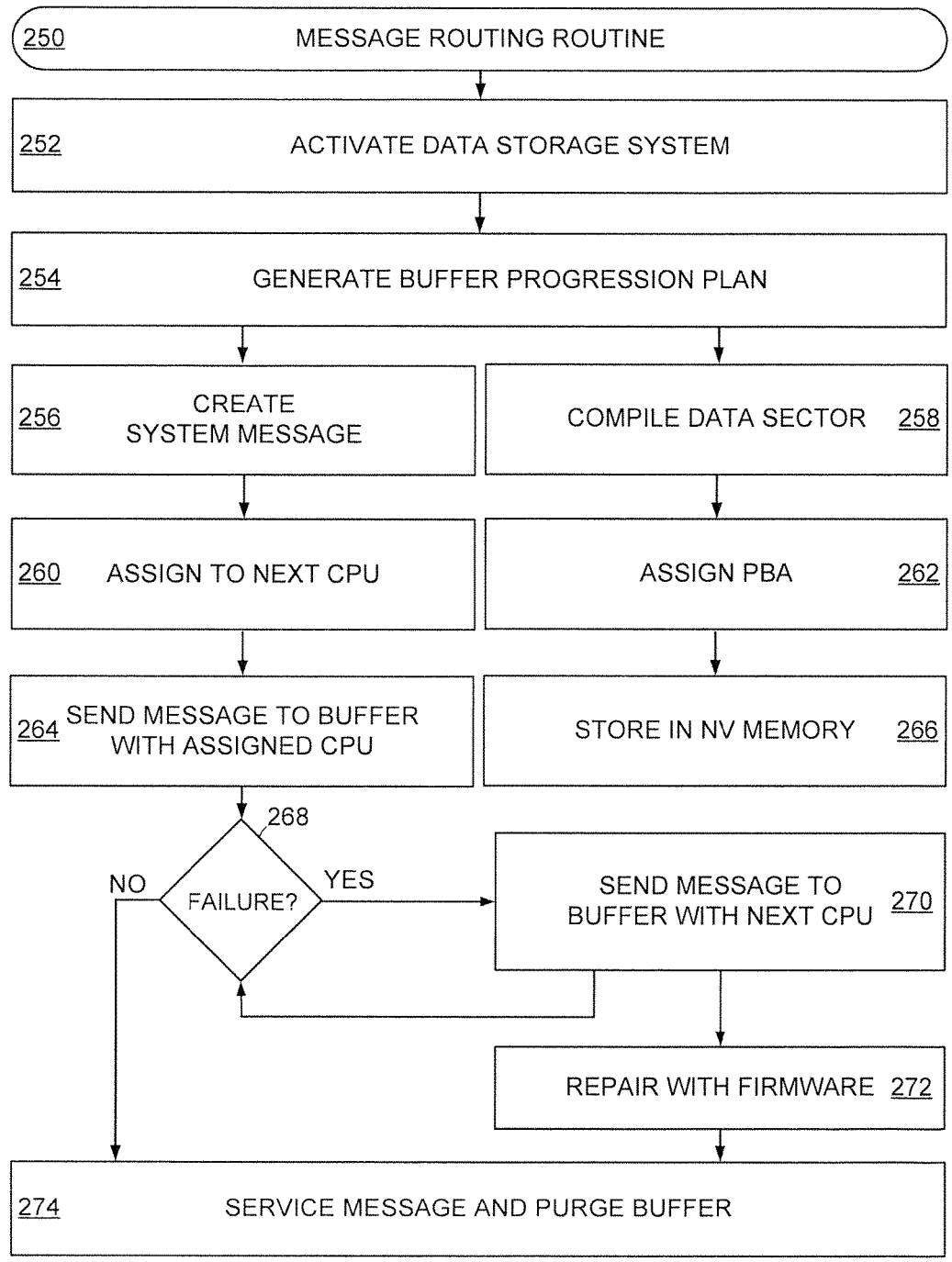
FIG. 6 is a flowchart of an example message routing routine that can be executed by the data storage system of FIG. 1 in accordance with some embodiments.

FIG. 6 is a flowchart of an example message routing routine 250 that can be executed by the various aspects and embodiments of FIGS. 1-5. Initially, step 252 activates the data storage system with at least one host connected to at least one data storage device via a wired/wireless network. One or more message modules can be physically resident on-chip in the network hardware as well as in any data storage device.

At any time, the message module can generate a buffer progression plan that establishes when and where messages are to be sent to the various buffers of the data storage system. It is noted that the memory buffers are different than the non-volatile memory of the respective data storage devices. A memory buffer is contemplated, but not required, to be a temporary storage location for a system message and any data associated with servicing the message.

Establishment of the buffer progression plan allows data and system messages to respectively be created and/or received in steps 256 and 258. The creation/reception of a system message is not required to coincide with the reception of user-generated data or the compilation of user-generated data into a data sector. However, the concurrent operation of step 256 and 258 shown in FIG. 6 conveys how speed and capabilities of an on-chip message module can operate along with the processing of user-generated data. Similarly, the data storage system and message module may, or may not, concurrently assign the created message to the next CPU/buffer combination in step 260 and assign a physical block address (PBA) to the data sector in step 262. It is noted that the compilation of data in step 258 may assign a PBA.

Execution of the message transfer and data storage assigned in steps 260 and 262 are respectively carried out in steps 264 and 266, which can occur concurrently, independently, or consecutively. Such execution can be continuously or sporadically monitored by the message module, network controller, and local device controller in decision 268 to determine if a failure has occurred to the storage of data in the non-volatile (NV Memory) of a data storage device or the servicing of the system message in the assigned buffer. A detected, or predicted, failure in decision 268 triggers step 270 to resend the system message to the next buffer/CPU of the buffer progression plan.

An encountered failure after step 270 causes the message module and/or network controller to repair portions of the system or message with firmware. A repaired message and system, or if no message failure exists from decision 268, advances to step 274 where the substance of the system message is serviced and the buffer where the message was present is purged. It is noted that the various aspects of routine 250 are merely exemplary and in no way required or limiting. As such, any portion of FIG. 6 can be altered or removed just as additional steps and decisions can be added.

What is claimed is:

1. A method comprising:
    activating a data storage system connecting first and second data storage devices with a host via a network, the network comprising a network controller having a message module;
    generating a buffer progression plan with the message module;
    assigning a first system message to a first buffer and first computing unit of the first data storage device;
    assigning a second system message to a second buffer and second computing unit of the second data storage device;
    servicing the first and second system messages with the respective first and second computing units; and
    activating firmware with the message module in response to a failure in servicing the first or second system messages.

2. The method of claim 1, wherein the first and second system messages are services concurrently.

3. The method of claim 1, wherein the first and second system messages are services consecutively.

4. The method of claim 1, wherein the first and second system messages are each generated by the message module.

5. The method of claim 1, wherein the buffer progression plan rotates between different buffers at predetermined intervals.

6. The method of claim 1, wherein each buffer is purged after servicing the respective system messages.

7. The method of claim 1, wherein the message module logs the assigned combination of buffer and computing unit.

8. The method of claim 5, wherein each buffer of the buffer progression plan corresponds with a different computing unit.

9. A method comprising:
    activating a data storage system connecting first and second data storage devices with a host via a network, the network comprising a network controller having a message module physically resident on-chip in the network controller;
    generating a buffer progression plan with the message module;
    assigning a first system message to a first buffer and first computing unit of the first data storage device;
    assigning a second system message to a second buffer and second computing unit of the second data storage device;
    servicing the first and second system messages with the respective first and second computing units; and
    assigning a third system message to an off-chip buffer with the message module.

10. The method of claim 9, wherein the message module activates firmware in response to a failure in servicing the first system message.

11. The method of claim 9, wherein the message module executes a message division plan that creates sub-messages distributed to multiple different buffers of the data storage system.

12. The method of claim 9, wherein the message module alters the buffer progression plan in response to detected system performance being below a predetermined threshold.

13. The method of claim 9, wherein the off-chip buffer comprises a non-volatile memory.

14. The method of claim 13, wherein a computing unit of the network controller services the third system message.

15. An apparatus comprising a data storage system connecting first and second data storage devices with a host via a network, the network comprising a network controller having a message module physically resident on-chip in the network controller, the message module configured to generate a buffer progression plan with the message module and execute the buffer progression plan by assigning a first system message to a first buffer and first computing unit of the first data storage device and assigning a second system message to a second buffer and second computing unit of the second data storage device, and assigning a third system message to an off-chip buffer, the first and second system messages respectively serviced with the first and second computing units.

16. The apparatus of claim 15, wherein the network controller comprises a third buffer present on-chip.

17. The apparatus of claim 15, wherein the first and second data storage devices are physically separated.

18. The apparatus of claim 15, wherein each buffer is a volatile type memory.

19. The apparatus of claim 15, wherein the network controller comprises a programmable controller present on-chip.

20. The apparatus of claim 15, wherein the non-volatile memory comprises flash memory.

\* \* \* \* \*

UNITED STATES PATENT AND TRADEMARK OFFICE
CERTIFICATE OF CORRECTION

PATENT NO. : 10,248,357 B2  
APPLICATION NO. : 15/642404  
DATED : April 2, 2019  
INVENTOR(S) : Thomas V. Spencer Page 1 of 1

It is certified that error appears in the above-identified patent and that said Letters Patent is hereby corrected as shown below:

In the Claims

In Column 7, Line 11 Claim 15:
"device and assigning a second system" should be "device, assigning a second system"

Signed and Sealed this
Fourteenth Day of May, 2019

Andrei Iancu
*Director of the United States Patent and Trademark Office*